April 15, 1924.　　　　　H. A. SCHILLING　　　　　1,490,857
GRASS CATCHER FOR LAWN MOWERS
Filed July 7, 1922　　　2 Sheets-Sheet 1
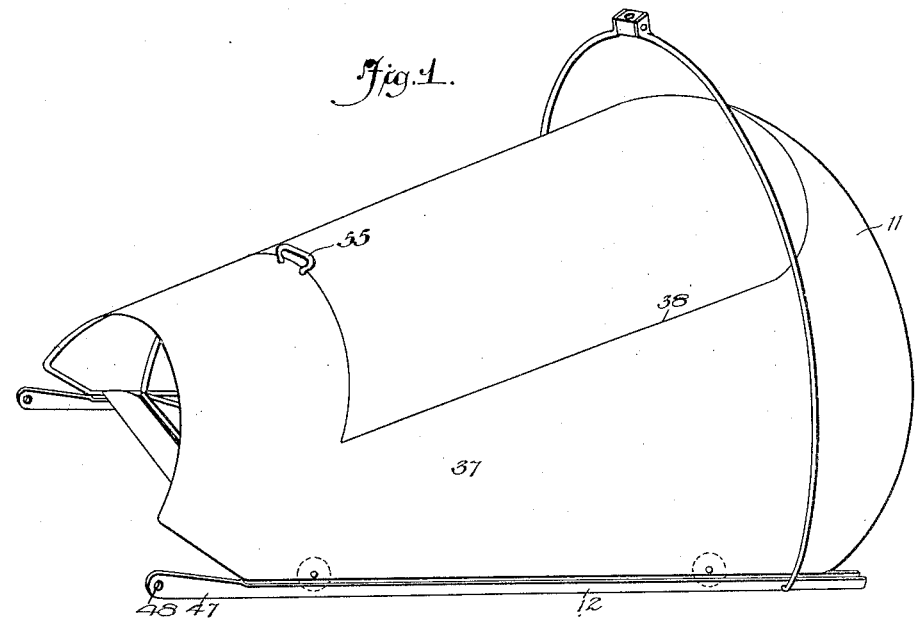
Fig. 1.
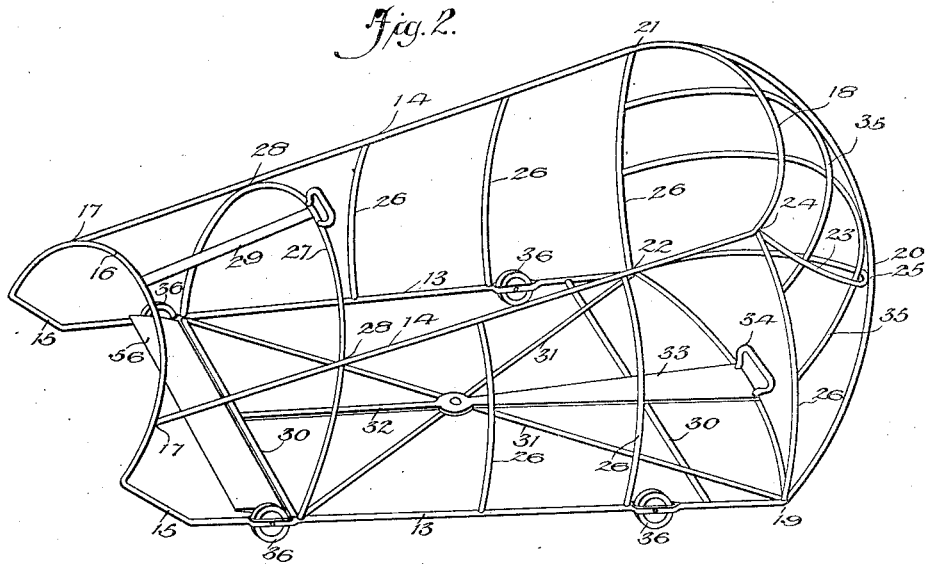
Fig. 2.
WITNESSES
INVENTOR
Harry A. Schilling
BY 
ATTORNEYS

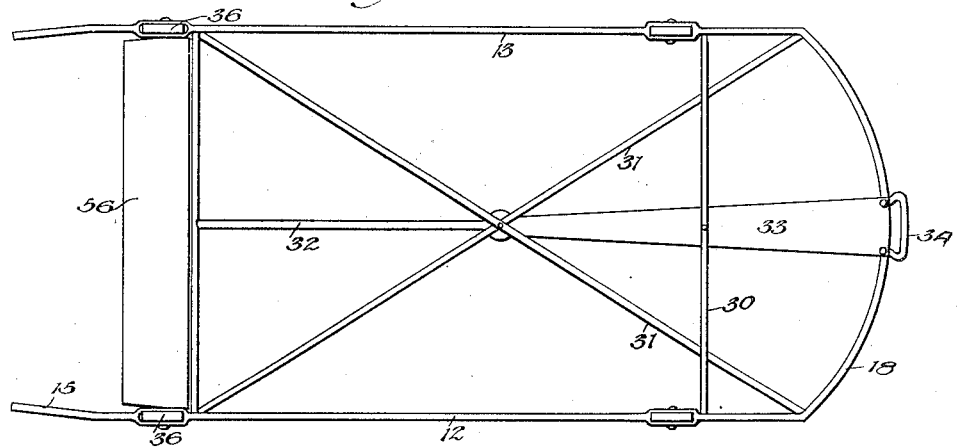
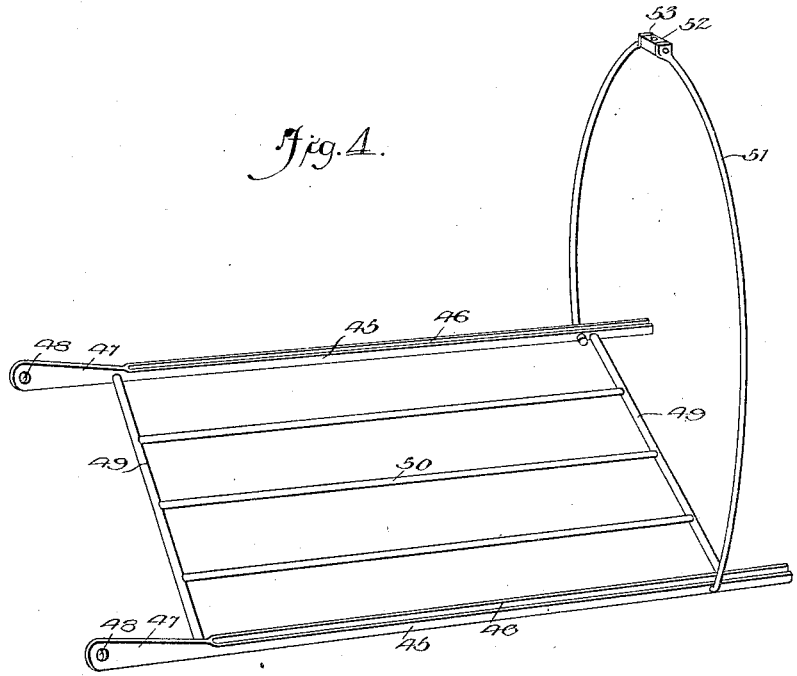

Patented Apr. 15, 1924.

1,490,857

UNITED STATES PATENT OFFICE.

HARRY A. SCHILLING, OF NEW YORK, N. Y.

GRASS CATCHER FOR LAWN MOWERS.

Application filed July 7, 1922. Serial No. 573,267.

*To all whom it may concern:*

Be it known that I, HARRY A. SCHILLING, a citizen of the United States, and a resident of the city of New York, borough of Queens, in the county of Queens and State of New York, have invented a new and Improved Grass Catcher for Lawn Mowers, of which the following is a full, clear, and exact description.

The present invention relates to new and useful improvements in lawn mowers and it pertains more particularly to a grass catching device therefor.

It is one of the primary objects of the invention to provide a new and improved form of grass catcher in which a receptacle for containing the grass is bodily removable from the mower for the purpose of discharging the grass therefrom.

It is a further object of the invention to provide a separate attachment for the receptacle whereby the receptacle may be expeditiously removed and replaced in operative position.

It is a further object of the invention to provide a frame or the like adapted to be attached to a lawn mower and upon which the receptacle is bodily movable.

With the above and other objects in view, reference is had to the accompanying drawings, in which—

Figure 1 is a perspective view of a grass catcher constructed in accordance with the present invention;

Fig. 2 is a perspective view of the receptacle frame;

Fig. 3 is a bottom view of the receptacle frame;

Fig. 4 is a perspective view of the frame upon which the receptacle is mounted.

Referring more particularly to the drawings, the reference character 11 designates the receptacle, and 12 designates the frame upon which the receptacle is mounted, which frame forms the means by which the receptacle is attached to a mower.

The receptacle is formed by covering a suitable framework with canvas or other suitable material, and securing the canvas thereto in any desired manner. By reference to Fig. 2, it will be noted that the framework which forms the receptacle comprises two lower side members 13 and two upper side members 14. Each of the lower side members 13 has its forward end bent upwardly as indicated by the reference character 15, and said bent forward ends are connected by a curved arch-shaped member 16. The two upper side members are connected to this curved or arch-shaped member 16 as indicated by the reference character 17, the rear end of said upper side members 14 being connected by a curved member 18.

Connected to the lower side member 13 on one side as at 19, is an upwardly projecting member 20, connected at its opposite end to the connection between the upper side member 14 and the curved member 18 on the opposite side to the point 19, as indicated by the reference character 21. Connected as at 22 to the lower side member on the side of the frame opposite to the point 19, is an upwardly extending curved member 23, connected as at 24 to the upper side member on the same side of the frame as the point 19. These members 20 and 24 cross each other at the point indicated by the reference character 25.

The two side members 13 and 14 are connected by vertically extending braces 26, said braces being connected at their ends to the side members 13 and 14.

Near the forward end the two lower side members are connected by a hoop-shaped member 27, which is also connected at the point 28 with the upper side members 14. This member 27 is connected to the curved member 16 by means of a brace or the like 29. The lower side members are further connected by transversely extending braces 30, diagonally extending braces 31, and a longitudinally extending brace 32, the rear end of which is broadened as at 33 and provided with a handle 34. Connecting the rear side braces 26 on opposite sides of the machine, are curved braces 35, said curved braces being positioned in a horizontal plane.

Mounted in each of the lower side members 13, is a plurality of rollers 36, and said rollers are adapted to engage the track of a framework to be hereinafter more specifically described.

In order to provide the receptacle, the frame heretofore described is covered with canvas, such as designated by the reference character 37, and said canvas is so cut as to provide a door or hinge cover 38 which may be removed from the receptacle.

By reference to Fig. 4, it will be observed that a framework is employed and said framework comprises two side members 45, each of which is formed on its upper face with a channel 46. The forward end of each of these members is flattened as at 47, and is provided with an opening 48, adapted to receive a suitable means for attachment of the frame to a lawn mower. The side members 45 are connected by transversely extending braces 49 which in turn are connected by longitudinally extending braces 50. Connected to the side members and extending upwardly therefrom is a bail member 51, and said bail member 51 is provided with a block 52 having an opening 53, by means of which the bail is attached to the handle of the mower to support the rear end of the frame.

The device operates in the following manner:

The frame upon which the receptacle is mounted is attached to the mower and the receptacle is moved through the bail member 51 with its rollers 36 in the channels 46 of the side members 45. As the mower is moved and the grass is cut, the latter is projected into the receptacle 11 and as the receptacle becomes filled with grass, the same is moved off the frame on which it is supported and the grass is removed therefrom by dumping, after which the receptacle is again positioned on the frame for further use.

To aid in removing and dumping the receptacle, a handle 55 is employed and said handle permits of the carrying of the receptacle with its open end upward to prevent accidental displacement of the cut grass contained therein.

In order to more fully collect the grass, the forward or open end of the receptacle is provided with a pick-up plate 56, which tends to gather any loose grass on the surface over which the mower is traveling.

The receptacle remains in proper position on the frame on level ground and is prevented from moving forwardly in going down grade by the rollers contacting with the ends of the channels, and if it should be found that in going up grade it moves rearwardly, the operator may, at his discretion, employ any suitable means to prevent such movement.

From the foregoing it is apparent that the present invention provides a new and improved form of grass catcher for lawn mowers in which a receptacle is employed for catching the grass, which receptacle is bodily removable from the lawn mower without necessitating the removal of the actual attaching means of said receptacle, thus greatly facilitating the dumping operation.

What is claimed is:

1. A grass catcher for lawn mowers, comprising a receptacle supporting frame having longitudinally channelled side bars, the front ends of which are provided with means by which they can be pivoted to a lawn mower and provided at their rear ends with a pivoted bail for attachment to the handle of the mower, and a grass receptacle consisting of a covered frame provided with lower side bars and a pair of wheels in each of said lower side bars, said receptacle being mounted on the supporting frame with its wheels traveling in channels of its side bars.

2. In a grass catcher for lawn mowers, a receptacle supporting frame provided at its forward end with means for pivotally connecting it to lawn mower and at its rear end with a pivoted bail for attachment to the handle of the mower, and a grass receptacle slidably mounted on the said frame, said receptacle consisting of an arched skeleton frame having one of its lower longitudinal braces provided with a handle at its rear end and with a handle on one of its arched members adjacent its front end, and a canvas covering for said frame.

HARRY A. SCHILLING.